United States Patent
Gotwals et al.

(10) Patent No.: US 7,016,809 B1
(45) Date of Patent: Mar. 21, 2006

(54) METHOD AND SYSTEM FOR AUTOMATICALLY INTERPRETING COMPUTER SYSTEM PERFORMANCE MEASUREMENTS

(75) Inventors: Jacob K. Gotwals, Cupertino, CA (US); Neeraj Garg, San Mateo, CA (US)

(73) Assignee: Intel Corporation, Santa Clara, CA (US)

(*) Notice: Subject to any disclaimer, the term of this patent is extended or adjusted under 35 U.S.C. 154(b) by 574 days.

(21) Appl. No.: 09/669,604

(22) Filed: Sep. 26, 2000

(51) Int. Cl.
*G06F 11/00* (2006.01)
*G06F 11/30* (2006.01)

(52) U.S. Cl. .......................... 702/185; 714/26
(58) Field of Classification Search ............... 702/183, 702/185, 186; 714/25, 30, 26, 48; 700/26
See application file for complete search history.

(56) References Cited

U.S. PATENT DOCUMENTS

| | | | | |
|---|---|---|---|---|
| 5,107,499 A | * | 4/1992 | Lirov et al. | 371/15.1 |
| 5,272,704 A | * | 12/1993 | Tong et al. | 714/26 |
| 5,287,505 A | * | 2/1994 | Calvert et al. | 714/26 |
| 5,434,955 A | * | 7/1995 | Kumamoto | 706/52 |
| 5,664,093 A | * | 9/1997 | Barnett et al. | 714/31 |
| 5,666,481 A | * | 9/1997 | Lewis | 714/4 |
| 5,729,472 A | * | 3/1998 | Seiffert et al. | 702/188 |
| 6,249,755 B1 | * | 6/2001 | Yemini et al. | 702/183 |
| 6,336,106 B1 | * | 1/2002 | Evans | 706/12 |
| 6,343,236 B1 | * | 1/2002 | Gibson et al. | 700/79 |
| 6,507,832 B1 | * | 1/2003 | Evans et al. | 706/61 |
| 6,622,264 B1 | * | 9/2003 | Bliley et al. | 714/26 |

OTHER PUBLICATIONS

Adrian Cockcroft, "System Performance Monitoring" Sep. 1995.

* cited by examiner

*Primary Examiner*—Marc S. Hoff
*Assistant Examiner*—Paul L Kim
(74) *Attorney, Agent, or Firm*—Blakely, Sokoloff, Taylor & Zafman LLP

(57) ABSTRACT

An improvement in applying and interpreting encoded knowledge about computer system performance engineering and in enabling a user to more readily understand and apply that knowledge to improve computer system performance. Textual and graphical depictions of insights, advice, behaviors, and explanations can be presented, all related to improving computer system performance. Fuzzy logic can be employed to accommodate incomplete measurement data and to present results in a qualitative format, presenting relevant data as being high, low, substantial, etc., rather than simply presenting the values of the associated counters leading to those determinations. Intermediate values used to generate the results can also be processed with qualitative rather than quantitative values.

27 Claims, 5 Drawing Sheets

METHOD AND SYSTEM FOR AUTOMATICALLY INTERPRETING COMPUTER SYSTEM PERFORMANCE MEASUREMENTS

BACKGROUND OF THE INVENTION

1. Field of the Invention

The invention pertains generally to analyzing computer system performance. In particular, it pertains to expert systems for interpreting computer system performance measurements.

2. Description of the Related Art

Modern computer operating systems have become quite capable and equally complex, with a great deal of interdependency between the various resources that are managed by the operating system. Such resource management can include task priority, the allocation of memory, distribution of programs and data between disk/main memory/cache, spooling, and many others. As a result, much effort has been put into getting the maximum performance out of a system by monitoring the system and adjusting various parameters to improve the performance parameters that are considered most important in that particular system. In a related activity, application developers conduct similar optimization efforts to maximize performance in their application programs. These optimization efforts are generically known as system tuning.

Various types of analysis systems are used to implement system tuning. Some vendors have attempted to use so called 'expert systems'. Expert systems incorporate a body of knowledge that is typically possessed by experts in a particular field, and an analytical framework that extracts the relevant portions of that knowledge to troubleshoot problems. Operators can then use those systems to analyze real-world problems and provide real-world solutions to those problems within that particular field.

Some analysis systems also use 'fuzzy logic', which is necessary when all the facts needed to accurately analyze a particular problem are not known. By examining the facts that are known, and assigning a probability to other data that isn't known for certain but is likely to be true, fuzzy logic can determine an answer that is likely to be true, and provide a confidence factor to indicate the likelihood of that answer actually being correct, given the incomplete state of the underlying assumptions.

Unfortunately, many analysis systems present their results in ways that are not easy for the human user to interpret. Numerical results from various activity monitors may be presented, but it is up to the user to determine the significance of those results and decide what should be done about them. This is especially true for analysis systems used for computer system performance tuning. Also, many such systems do not allow the user to supplement the database with "knowledge plug-ins", or supplemental knowledge, to encapsulate performance tuning expertise for specific problem domains like database tuning, graphics tuning, etc., or to upgrade the existing tuning system as relevant knowledge evolves. Because of these shortcomings, only experienced system tuners are able to make full use of such performance tuning systems, and many software developers do not fully benefit from such tools.

DETAILED DESCRIPTION OF THE INVENTION

Figure 1:
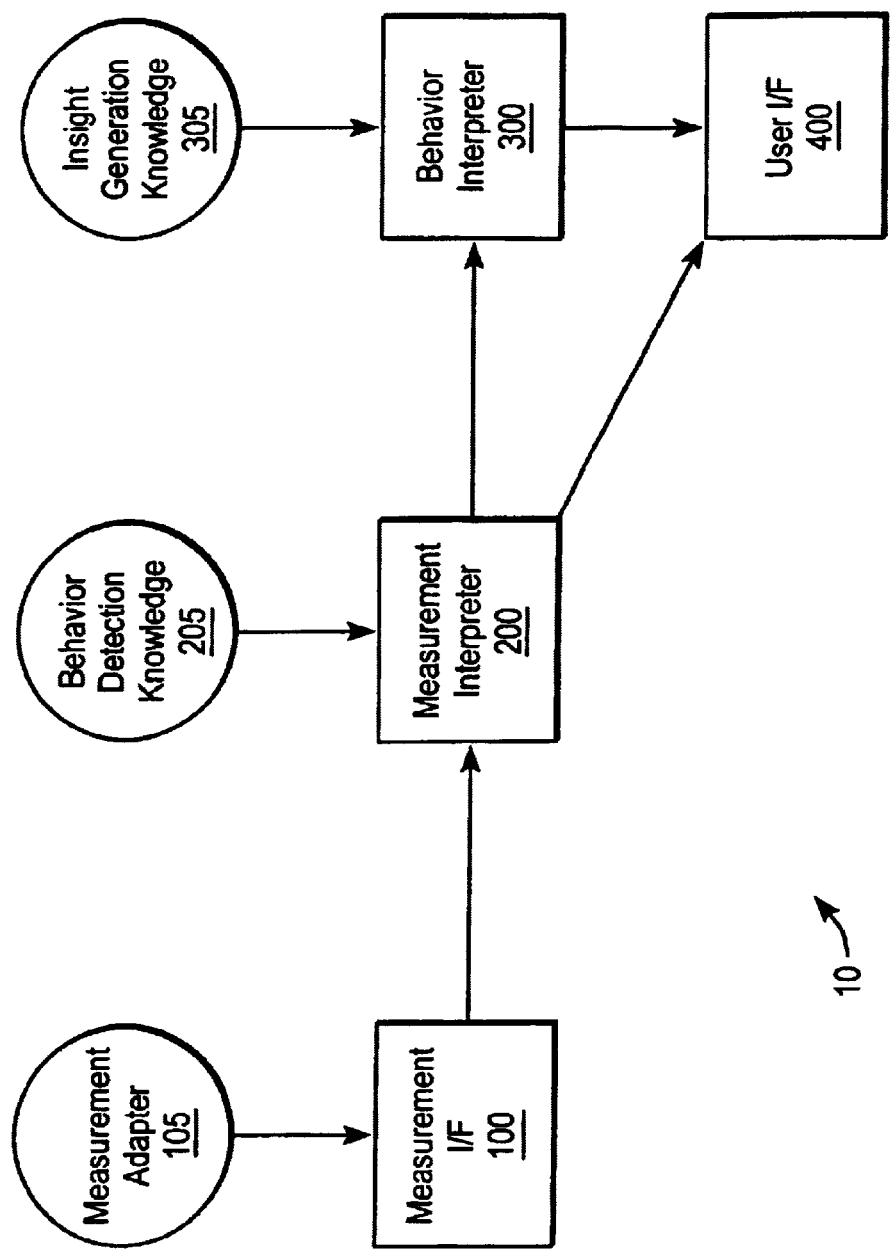
FIG. 1 depicts a system of the invention.

The invention adds functionality and ease-of-use to conventional computer tuning systems. The invention uses qualitative descriptions such as 'high', 'low', 'excessive', etc., to describe quantitative measurements, and uses these qualitative descriptions to generate insights/advice and present them to the user. In particular, the invention can include such things as: 1) user extensibility, 2) insights based on behavioral properties, 3) visualization of performance insights across measurement context dimensions such as time, 4) explanation of insights based on the same encoded knowledge data that is used to generate the insights, and 5) use of the abstraction of fuzzy subsystem behavioral properties to simplify knowledge development and insight explanation, and to permit portability of the tuning system by permitting threshold values to be adjusted without affecting other areas of the database.

It is helpful to define some of the terms used in this description, and provide examples:

Behavior—a monitored measurable activity in a computer system. Example: Cache misses.

Behavioral property—a qualitative description of a behavior in a computer system. Example: A 'high' cache miss rate.

Insight—a significant combination of behavioral properties implying a result to be brought to someone's attention. Example: "An L1 data cache bottleneck can be diagnosed when CPI is high, L1 cache misses are high and L2 cache misses are low."

Relevance—The degree to which an insight is applicable to a given set of performance measurements. This is generally expressed as a numerical value, with a higher number indicating greater relevance.

Advice—a description of what should be done in response to the situation described by the insight. Example: Reduce the L1 data cache bottleneck by reducing system parameters A, B and increasing parameters X and Y.

Applicability—A measure of how likely a given piece of advice is to resolve the associated problem. This is generally expressed as a numerical value, with a higher value indicating greater applicability.

Explanation—A description of why the insight or advice is true. The explanation can repeat the criteria used to generate the insight. Example: "There appears to be an L1 data cache bottleneck because CPI is high, L1 data cache misses are high, and L2 data cache misses are low."

Visualization—visual presentation describing the underlying information. Example: a graph of the L1 cache miss rate.

User extensibility—capability for the user to add new knowledge to the knowledge database.

Some of the features of an embodiment of the invention are described below in more detail.

User-Extensibility

The system can have functionality to permit encoded knowledge to be extended by the user or by third party knowledge developers through the use of knowledge plug-ins. This permits the expert knowledge base to grow and evolve over time, and to be customized to the particular application.

Behaviors

The system can use the abstraction of subsystem behavioral properties within the knowledge model. For example a behavior is "L2 cache misses" and a related behavioral property is "L2 cache misses are low". (L1 and L2 can refer to first- and second-level cache memories, respectively.) Using this abstraction, the encoded knowledge to monitor behaviors can be used to interpret performance counters (to determine what behavioral properties are present, e.g. are L2 cache misses high or low) separately from the encoded knowledge used to interpret behavioral properties (to determine what insights and advice are relevant, e.g. is a L1 cache bottleneck occurring, which may depend on whether L2 cache misses are high or low.)

Performance engineers typically use the concept of subsystem behavioral properties in the way they think about and describe strategies for solving performance engineering problems, rather that describing strategies in terms of measured parameter values such as counter values. For example, a performance engineer might say "An L1 data cache bottleneck can be diagnosed when CPI is high, L1 data cache misses are high, and L2 cache misses are low". The engineer would not generally express this knowledge directly in terms of the counters used to measure each of those properties, e.g., "an L1 data cache bottleneck can be diagnosed when counter Clockticks has value 98230, counter instructions Retired has value 83948, etc."

The use of qualitative behavioral properties allows the analysis to proceed in terms that performance engineers are familiar with.

Explanations of Analysis of Behaviors

Incorporating the concept of behavioral properties into a knowledge model leads to a more natural knowledge representation that is more easily extensible by performance engineers, and enables the system to provide better automatically generated explanations of its analyses. For example, if the system has generated the insight "there appears to be an L1 data cache bottleneck", the same encoded knowledge that was used to generate this insight can be used to generate an explanation of the insight. The explanation would read "There appears to be an L1 data cache bottleneck, because CPI is high, L1 data cache misses are high, and L2 cache misses are low". Without the abstraction of behavioral properties, automatically generated explanations would have to refer directly to the underlying performance counters. For example: "there appears to be an L1 data cache bottleneck because counter Clockticks has value 98230, counter instructions Retired has value 83948, etc", which is less useful/understandable for users.

Prioritized Insights, Advice, and Behaviors

As previously stated, human knowledge about performance tuning often takes the form of informal diagnostic rules such as "An L1 data cache bottleneck can be diagnosed when CPI is high and L2 cache misses are low". The use of the terms high and low implies that there are not hard-and-fast thresholds for where an L1 data cache bottleneck starts occurring if CPI is above a certain threshold. Instead of hard-and-fast thresholds, the reality is that the higher CPI and L1 data cache misses, and the lower L2 cache misses, the more likely an L1 data cache bottleneck becomes. Systems that allow for the possibility that statements like "CPI is high" may be true or false or somewhere in between (e.g., when CPI is somewhat high) are said to make use of fuzzy logic (as opposed to standard crisp logic).

Fuzzy logic is an attempt to mimic the way performance engineers tend to think of performance engineering problems, and the fuzzy knowledge used by the invention captures this fuzziness directly. The benefit for users is that the system can use this fuzzy knowledge representation format to deliver not only insights and advice, but also a score for that insight and advice indicating how relevant each insight/advice is in terms of the measured data. One concept is that just as system behaviors are fuzzy (CPI may be high or low somewhere in between) insights are fuzzy too. "An L1 data cache bottleneck is occurring" may be true or false or somewhere in between (indicating a slight bottleneck, a severe bottleneck, etc.) An alternative to fuzzy insights is alerts, which are crisp—an alert is either delivered to the user or it is not (an example of an alert would be "an L1 data cache bottleneck is occurring", with no associated indication or how severe the bottleneck is). Insights/advice with an associated score are more useful than alerts because they allow multiple insights/advice to be prioritized by their relevance.

Visualization or Disposition of Insights, Advice, and Behaviors

Insights, advice, and behaviors can all be fuzzy properties (that is, there is a score associated with each), which makes it possible to generate visualizations of the changes in these scores across a contextual dimension like time. For example, generating a visualization that graphs the score of the insights "L1 data cache bottleneck" against time makes it possible for the user to quickly understand the relative severity at different times, and to relate this to what other system functions are occurring at the same time. This feature (visualizing performance problem hotspots) can complement any existing hotspot-tracking visualization features, which in conventional systems only allow the user to visualize counter hotspots and counter ratio hotspots. The visualization can be in the form of a graph of the scores of insights plotted against the associated regions of code, as defined by the instruction pointer or by some other user defined metric.

Visualization is not the only function that can be performed with these results. The results can also be provided to other processes or other systems for disposition. The results can be stored or transferred, to be subsequently visualized, analyzed, or otherwise processed by those other processes or systems.

Partial Analysis Capability

In performance engineering, one rarely has a complete set of performance measurements for the systems being tuned, since there is a time cost for obtaining measurements. Expert performance engineers are able to make a partial analysis to prioritize among choices for what to measure next. Just like an expert performance engineer, the system is able to make a partial analysis based on a partial set of measurements, reporting which insights appear to be the most relevant given the partial data, and indicating what further measurements would be most useful to validate or disprove those insights.

System Description

FIG. 1 shows an overview of a system 10 of the invention. In one embodiment, the circles in FIG. 1 can represent storage for the indicated data and/or programs, while rectangles can represent processing areas. Measurement interface 100 receives measurements of various system parameters from a measurement adapter system 105, which can be a collection of one or more devices and/or software routines for collecting the desired parameters. Measurement interface 100 provides this measurement data to measurement interpreter 200, which interprets the data based on the rules provided by behavior detection knowledge 205. Measurement interpreter 200 can provide behavior data and behavior explanation data to behavior interpreter 300, which also receives insight generation knowledge 305. Behavior interpreter 300 can then provide user interface 400 with ranked insights, advice and behaviors, and explanations of those insights and advice. User interface 400 can also receive inputs directly from measurement interpreter 200. The user interface presents the information to the user in a suitable format, which can include text and/or graphics.

Figure 2:
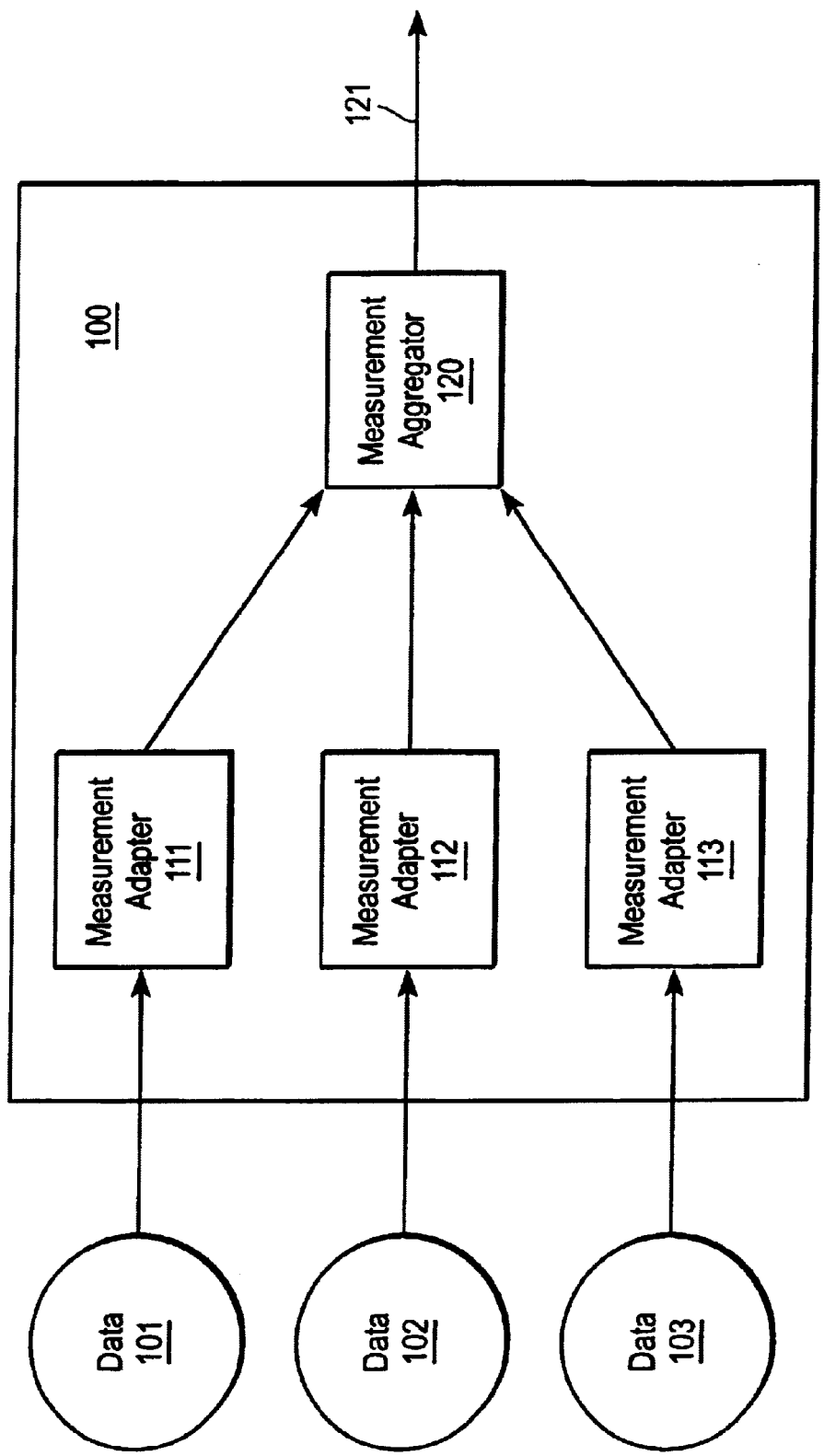
FIG. 2 shows a measurement interface system of the invention.

FIG. 2 shows a more detailed view of the measurement interface 100 of FIG. 1. Measurement interface 100 can use measurement adapters 111, 112 and 113, which can be some of the adapters that collectively make up measurement adapter system 105. These adapters can be comprised of hardware, software, or a combination of both. Each adaptor can receive measurement data, shown as 101, 102 and 103, and provide this data to measurement aggregator 120, which collects the combined information in a form suitable for passing on to the next stage at 121 for interpretation.

Figure 3:
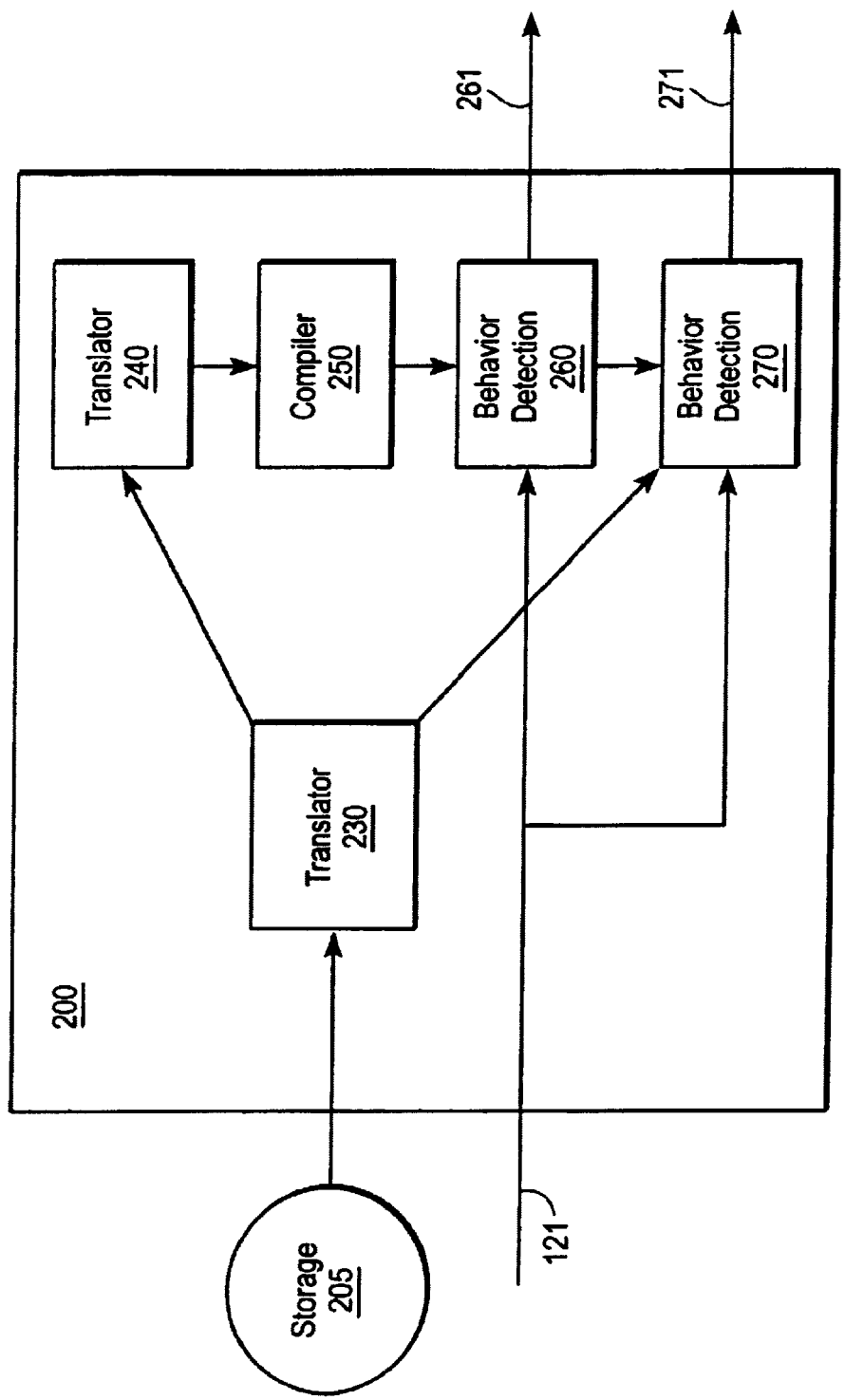
FIG. 3 shows a measurement aggregator of the invention.

FIG. 3 shows a more detailed view of measurement interpreter 200. Behavior detection knowledge (knowledge about how to detect computer subsystem behavioral properties based on measurement data) is stored at 205. A behavioral-knowledge-to-intermediate-form translator 230 can be used at knowledge database design time to generate an intermediate representation of the behavior detection knowledge that is sent to behavior detection subsystem 270 at input 121, which can interpret the intermediate form at run time to create behavior data and the associated behavior explanations. The behavior data and behavior explanations can then be presented at 271 to the following stage for interpretation. For faster performance, the intermediate representation can also be sent to a translator 240 that converts the knowledge into a C++ representation of the behavior detection knowledge, which can then be compiled by a C++ compiler 250 to generate a compiled behavior detection subsystem 260. Using inputs received at 121, behavior detection subsystem 260 can then present the behavior data and behavior explanations at 261 to the following stage for interpretation.

Thus, at run time the measurement data from the measurement aggregator 120 gets sent at 121 to either the compiled or the interpreted version of the behavior detection subsystem (260 or 270, respectively), which detects behavioral properties of the computer's subsystems, as well as explanations of the behavioral properties in terms of the measurement data.

Figure 4:
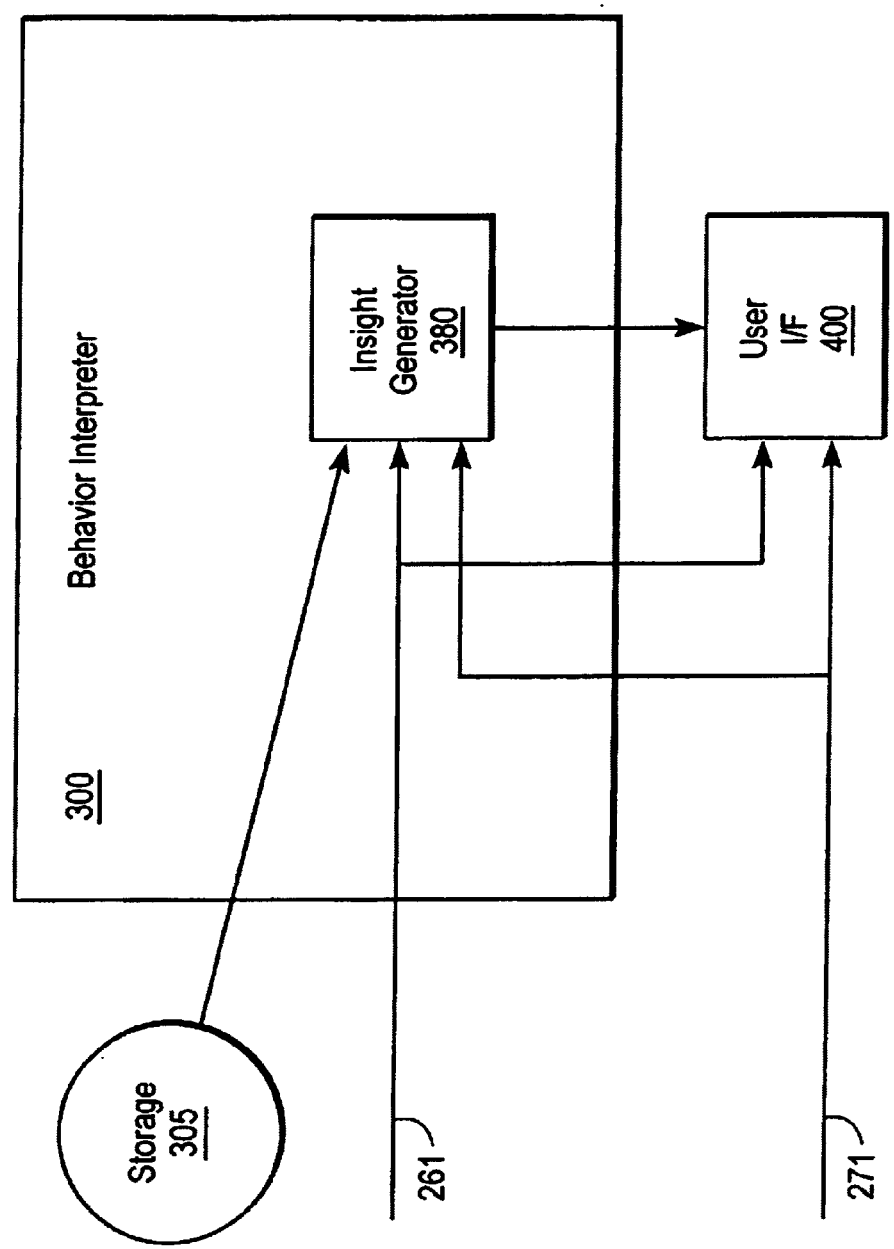
FIG. 4 shows a behavior interpretation system of the invention.

FIG. 4 shows a more detailed version of behavior interpreter 300. The behavioral property information 261 for behavior detection subsystem 260, or behavioral property information 271 for behavior detection subsystem 270, can be sent to an insight generator 380. Insight generation knowledge (knowledge about combinations of behavioral properties that indicate significant performance conditions the user should be notified of, as well as advice associated with those conditions) is stored at 305. The insight generation subsystem uses this knowledge to interpret the behavioral properties to generate insights, advice, and explanations of insights in terms of the computer's behavioral properties. This information can then be displayed by the user interface 400, along with the explanations of behavioral properties received at 261 and 271. The information can be provided to a user in a ranked order, based on relative importance. A user, in this context, can be a person operating the system, but can also be an interface, a program, or any other thing capable of receiving the results.

Measurement adapters 111–113 can use context information (not shown in the drawing) to determine what segment of the performance measurements to collect. The entire process above can be repeated multiple times as this context information is varied along some context dimensions, such as time, to generate insight/advice/behavior scores parameterized by that context dimension. These parameterized scores can be used as the basis for generating visualizations of insights/advice/behaviors over a given context in the user interface 400.

Procedural Description

Figure 5:
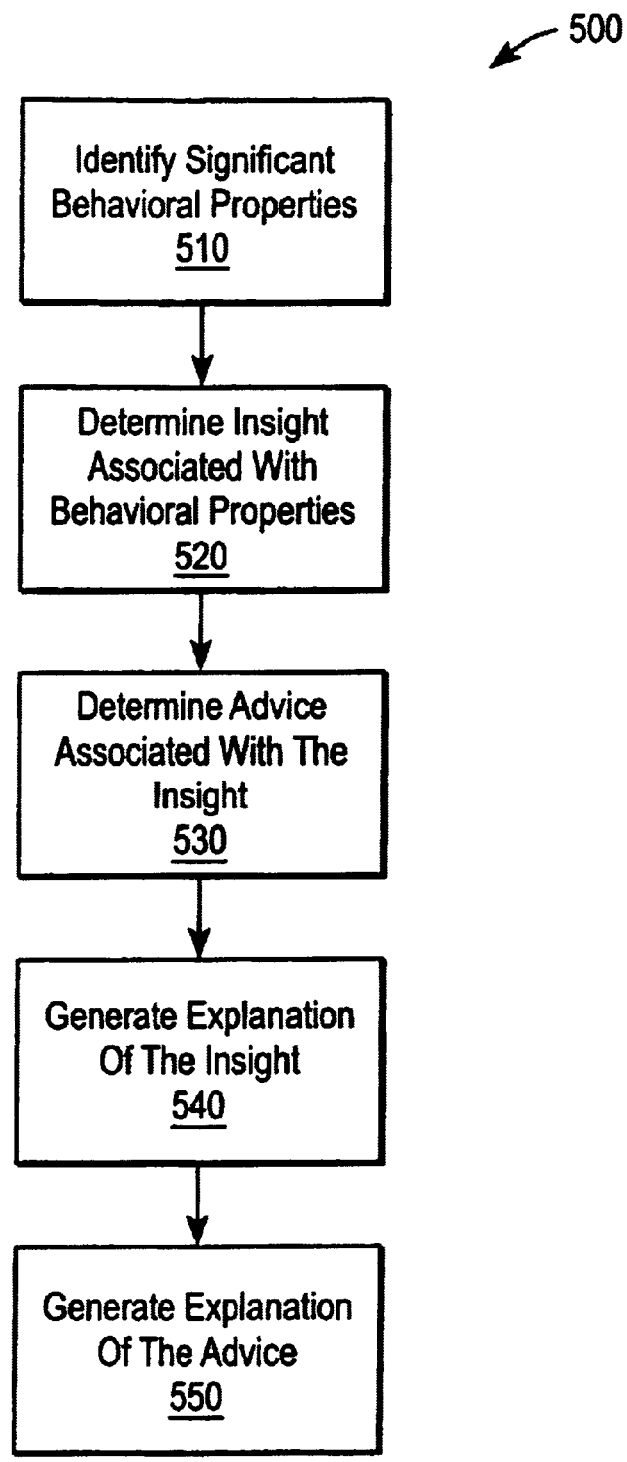
FIG. 5 shows a flow chart of a process of the invention.

FIG. 5 shows a flow chart 500 of some basic steps in a procedural embodiment of the invention. At step 510, significant behavioral properties of the system are identified, based on measured properties. At step 520, one or more insights associated with the identified behavioral properties are determined. At step 530, advice associated with the insights is determined. At step 540, an explanation of the insight is generated, while at step 550 an explanation of the advice is generated. Both of these explanations can then be presented to the user. However, the explanations can also be stored or transmitted to another location.

A more detailed description of a process of one embodiment of the invention follows, including those portions that involve setting up the database.

Building the Knowledge Base

Encoding knowledge about how significant computer subsystem behavioral properties can be inferred from performance data and context data. The knowledge can be represented as follows: each behavior is represented by 1) a behavior name (textual data describing the behavior), 2) a set of property values with corresponding property names (textual data describing the possible properties of the behavior), and 3) a mathematical expression or a program, where the mathematical expression or program computes a behavior value given the performance data and context data, where the behavior value lies within a predefined range of a set of property values, and where a proximity of the behavior value to each property value indicates the degree to which the behavior (identified by the behavior name) has that property (identified by the corresponding property value name).

Encoding knowledge about insights that capture the significance of particular combinations of computer subsystem behavioral properties that are important. The knowledge can be represented as follows: each insight is represented by 1) an insight name (textual data briefly describing the insight), 2) an insight description (textual data describing the insight and its significance at greater length), 3) a weighted list of advice describing actions that should be taken to improve the performance of the computer system when the insight is relevant (where advice is defined below), 4) a list of constraints describing conditions under which the insight should be excluded from consideration (where constraints are defined below), and 5) a list of weighted behavioral properties identifying the conditions under which the insight is relevant, where the weight of each behavioral property indicates the importance of that property relative to the other properties. An advice can include an advice description (textual data describing actions that should be taken to improve performance) and a list of constraints describing conditions under which the advice should not be given (where constraints are defined below). A constraint consists of a category (taken from a set of available categories) and an associated category value (each category has a set of possible category values).

Analyzing Computer System Performance

Identifying significant behavioral properties of the computer's subsystems, based on measured performance data. The mathematical expression or program for each behavior described above can be applied to the performance data (and any associated context data) to compute a behavior value for each behavior for which the necessary measurements and context data are available.

Analyzing the behavioral properties of the computer's subsystems to compute the relevance of each insight. This can be done by combining the contribution of each behavior associated with the insight. The contribution of each behavior can consist of the proximity of the measured value of the behavior to the expected behavioral properties under which the insight is relevant, taking into account the weight of the behavior for the insight.

Computing the relevance of each advice for a given context. This can begin with identifying those insights that fall outside a predetermined acceptable range and are therefore exceptions that can be ignored. The contribution of the identified insights associated with an advice can then be combined. The contribution of an insight to an advice can, in one embodiment, be computed by taking a square of the result of multiplying the relevance of the insight by the applicability of the advice for the insight. The combination can be carried out by taking a square root of the sum of contributions from insights. Some of the terms can be further explained in this manner:

For every $Insight_i$, there is a function $Filter_i$, which takes the input Relevance, and whose output=1. The Relevance is considered interesting, and therefore worthy of further examination, only if it falls within a predefined range of values.

Applicability is a function stored in the database, in which a given value of Applicability($Insight_i$,$Advice_j$) falls between 0 and 1.

$Relvance_i(Insight_i)$ is a computed value of relevance for $Insight_i$.

The following formulas can be used:

Let $A_k$ denote the relevance of Advice k $R_i$ denote the relevance of Insight i $V_i$ denote the set of possible values of relevance for Insight i $Filter_i=V_i \rightarrow [0,1]$ (Filter$_i$ takes the measured relevance of Insight i and returns a 0 if this measured value will not be of interest to the user, and returns a 1 otherwise.)

$App_{ki}$ denote the applicability of Advice k when Insight i is known to be relevant Then $$A_k = \sqrt{\Sigma_i(App_{ki} * Filter_i(R_i) * R_i)^2}$$

Computing the relevance of each behavior for a given context. This can begin with a relevance filter that identifies those insights with relevance values that fall outside the 'acceptable' range and are therefore exceptions that can be ignored. The contribution of the identified insights can then be combined. The contribution of an insight to a behavior can be computed by taking a square of the result of multiplying the relevance of the insight, the proximity of the behavior's measured value to its expected value, and the weight associated with the behavior for that insight. The combination can be carried out by taking a square root of the sum of contributions from insights. Some of the terms can be further explained in this manner:

$Weight_{ij}$ is a measure of the importance of $Behavior_j$ for $Insight_i$.

Proximity is a function that returns a value between 0 and 1, providing an indicator of the difference between the Expected value and the Measured value for $Behavior_j$.

The following formulas can be used:

Let $B_j$ denote the relevance of Behavior j $R_i$ denote the relevance of Insight i $E_{ij}$ denote the expected value for Behavior j when Insight i is relevant $m_j$ denote the measured value of Behavior j $W_{ij}$ denote the weight, or importance, of Behavior j for Insight i $P_j$ denote a set of possible values for Behavior j $Proximity_j = P_{j*Pj} \rightarrow [0,1]$. (Proximity$_j$ is a function that takes two values from the domain of Behavior j and returns a number between 0 and 1, where 1 indicates a perfect match between the two values, and 0 indicates no match. This function might not be linear.)

$C_{ij}$ denote the contribution of Behavior j in computing relevance of Insight i Then $$C_{ij} = (W_{ij} * Proximity(E_{ij}, m_j))^2$$

$$R_i = \sqrt{\Sigma_j(C_{ij})}$$

$$B_j = \sqrt{\Sigma_i(C_{ij} * R_i)}$$

Computing the relevance of each performance measurement for a given context. This can be done by combining contributions from all behaviors whose value could be computed. The contribution of a behavior to a measurement can be computed by taking a square of the result of multiplying the derivative of the behavior with respect to the measurement (or suitable approximation when the derivative is not computable) with the relevance of the behavior. The combination can be carried out by taking a square root of the sum of contributions from behaviors.

The following formulas can be used:

Let $C=\{C_1, C_2, \ldots C_n\}$ denote a set of possible measurements $D_i$ denote the measured values of $C_i$ $S_i$ denote the set of possible values of $D_i$ $P_j$ denote the set of possible values for Behavior j $B_j$ denote the relevance of Behavior j ($B_j$ is computed using m counters, $\{C_{j1}, C_{j2}, \ldots C_{jm}\}$ using function $F_j$: $F_j:S_{j1}*S_{j2}*S_{j3} \ldots *S^{jm} \rightarrow P$)

$F'_{jL}$ denote a suitable approximation of $F_j$ with respect to $C_{jL}$

Then $$\text{Relevance of } C_i = \sqrt{\Sigma_j(B_j * F'_{jL}(D_{j1}, D_{j2} \ldots D_{jm}))}$$

Explanations Provided by System

Generating a textual explanation of each insight for a given context. This can be done by listing all the behaviors by name, their measured values if available, and generating a textual description by finding the closest property value name and using adjectives describing the proximity of the behavior value to the property value such as "slightly", "very", etc. For example, "There appears to be an L1 data cache bottleneck, because CPI is very high, L1 data cache misses are somewhat high, and L2 cache misses are low".

Generating a textual explanation of the relevance of each advice for a given context. This can be done by listing all the insights that each item of advice is applicable to, along with a qualitative description of the relevance score of each insight. For example, "This advice has high relevance because it is applicable under the following conditions: 'L1 data cache bottleneck' (which is currently very relevant)".

Generating a textual explanation of the relevance of each behavior for a given context, and the manner in which the behavior has been computed. This can be done by listing all the associated insight names along with qualitative descriptions of their relevance scores, and listing the measurements with which the behavior was calculated and a textual representation of the mathematical expression or program that was used to generate the value for the behavior. The textual representation of a mathematical expression can be the expression itself, the textual representation of the program can be the representation made available with the program, if any, or the name of the program. For example, "This behavior has high relevance because it is associated with the following conditions: 'L1 data cache bottleneck' (which is currently very relevant)," etc., and "This behavior was computed via the following formula" (followed by a textual representation of the mathematical expression or program used to determine the behavior).

Generating a textual explanation of the relevance of each measurement for a given context. This can be done by listing the associated behaviors' names, their computed values and their relevance scores. For example, "This measurement is very relevant because it is used to compute CPI (which is currently very relevant)".

SUMMARIZING RESULTS

Generating textual summaries of insights, advice, and behaviors for a given context. This can be done by sorting them by relevance and listing their names in sorted order along with an indication of their relevance.

Generating graphical depictions of insights, advice, and behaviors for a given context. This can be done by graphing the relationship between their relevance values and context dimensions such as time, code location, etc.

Generating a list of significant sub-contexts of a given context for a given insight, advice, or behavior. This can be done by identifying sub-contexts for which the given insight, advice, or behavior has a relevance score higher than a given threshold.

In addition to the aforementioned embodiments, the invention can be implemented as instructions stored on a machine-readable medium, which can be read and executed by at least one processor to perform the functions described herein. A machine-readable medium includes any mechanism for storing or transmitting information in a form readable by a machine (e.g., a computer). For example, a machine-readable medium can include read only memory (ROM); random access memory (RAM); magnetic disk storage media; optical storage media; flash memory devices; electrical, optical, acoustical or other form of propagated signals (e.g., carrier waves, infrared signals, digital signals, etc.), and others.

The foregoing description is intended to be illustrative and not limiting. Variations will occur to those of skill in the art. Those variations are intended to be included in the invention, which is limited only by the spirit and scope of the appended claims.

We claim:

1. A method, comprising:
identifying one or more behavioral properties based on measured behavioral data in a computer system, each behavioral property including a behavioral description describing the respective behavioral property and a value representing a degree of relevancy of the respective behavioral property with respect to the measured behavioral data;
generating an analysis based on the one or more behavioral properties, the analysis including an analysis description indicating a result expected to happen based on a combination of the identified behavioral properties; and
determining an advice associated with the analysis, the advice suggesting what should be done in response to the expected result described by the analysis.

2. The method of claim 1, further comprising encoding knowledge of computer subsystem behavioral properties based on behavioral data to provide a basis for identifying the one or more behavioral properties.

3. The method of claim 2, wherein the encoding knowledge of computer system behavioral properties comprises:
associating one or more of the behavioral properties to each behavior, each of the behavioral properties including a description regarding the respective behavioral property;
associating one or more property values to each of the behavioral properties; and
calculating a behavior value based on the measured behavioral data using a mathematical formula to determine a relevancy of the behavioral properties.

4. The method of claim 3, further comprising comparing the behavior value with the one or more property values to determine which of one or more behavioral properties corresponding to the property values are relevant, wherein a proximity of the behavior value with respect to a behavioral property indicates a degree whether the respective behavioral property should be relevant.

5. The method of claim 1, further comprising encoding knowledge of analysis based on the behavioral properties to provide a basis for determining the analysis.

6. The method of claim 5, wherein the encoding knowledge of analysis comprises:
associating one or more of the analysis properties to each analysis, each of the analysis properties including an analysis description regarding the respective analysis; and
generating a weight list of advices describing actions that should be taken, wherein the advice is generated based on the determined analysis.

7. The method of claim 6, further comprising:
generating a list of constraints describing one or more conditions under which the respective analysis should be excluded from consideration; and
generating a list of weighted behavioral properties identifying the one or more conditions under which the respective analysis is relevant, wherein the advice is determined when the respective analysis is relevant.

8. The method of claim 7, wherein a weight of each behavioral properties indicates a relationship with other behavioral properties.

9. The method of claim 7, wherein the advice includes an advice description describing actions that should be taken and a list of constraints describing one or more conditions under which the respective advice should not be given.

10. The method of claim 7, further comprising determining a relevancy of the analysis based on contribution of each behavior associated with the analysis based on a proximity of the measured behavioral data with respect to one or more behavioral properties associated with the measured behavioral data.

11. The method of claim 1, further comprising generating an explanation of the analysis using in part the behavioral descriptions of the one or more behavioral properties when the corresponding behavioral properties are relevant based on the values associated with the respective behavioral properties.

12. The method of claim 1, further comprising generating an explanation of the advice using in part the behavioral descriptions and the analysis description.

13. The method of claim 1, wherein said identifying one or more behavioral properties includes identifying behavior whose value is outside a predefined range.

14. The method of claim 1, further comprising providing the analysis and the advice to a user, including displaying the analysis description and the advice.

15. A machine-readable medium having stored thereon instructions, which when executed by a processor can cause said processor to perform:

identifying one or more behavioral properties based on measured behavioral data in a computer system, each behavioral property including a behavioral description describing the respective behavioral property and a value representing a degree of relevancy of the respective behavioral property with respect to the measured behavioral data;

generating an analysis based on the one or more behavioral properties, the analysis including an analysis description indicating a result expected to happen based on a combination of the identified behavioral properties; and determining an advice associated with the analysis, the advice suggesting what should be done in response to the expected result described by the analysis.

16. The medium of claim 15, further comprising encoding knowledge of computer subsystem behavioral properties based on behavioral data to provide a basis for identifying the one or more behavioral properties.

17. The medium of claim 15, further comprising encoding knowledge of analysis based on the behavioral properties to provide a basis for determining the analysis.

18. The medium of claim 15, further comprising generating an explanation of the analysis using in part the behavioral descriptions of the one or more behavioral properties when the corresponding behavioral properties are relevant based on the values associated with the respective behavioral properties.

19. The medium of claim 15, further comprising generating an explanation of the advice using in part the behavioral descriptions and the analysis description.

20. The medium of claim 15, wherein said identifying one or more behavioral properties includes identifying behavior whose value is outside a predefined range.

21. The medium of claim 15, further comprising providing the analysis and the advice to a user including displaying the analysis description describing a problem about to happen and the advice indicating what should be done with respect to the problem.

22. A system, comprising:

a measurement interface to receive measured values of computer system performance parameters;

a measurement interpreter coupled to the measurement interface to receive the measured values from the measurement interface and to provide behavioral property data, the behavioral property data including a description for describing the respective behavioral property;

a behavior interpreter coupled to the measurement interpreter to receive the behavioral property data and to provide analysis and explanations, each of the analysis and explanations including a description describing the respective analysis and the explanation; and a user interface coupled to the behavior interpreter to present the analysis and explanations to a user using in part the descriptions of the behavioral property data, analysis, and explanations.

23. The system of claim 22, wherein the measurement interface includes a measurement adapter.

24. The system of claim 22, wherein the measurement interpreter includes a behavior knowledge interpreter.

25. The system of claim 22, wherein the measurement interpreter includes a compiler.

26. The system of claim 22, wherein the behavior interpreter includes an analysis generator.

27. The system of claim 26, wherein the analysis generator includes an advice generator.

* * * * *